July 22, 1958 S. SCHNELL 2,844,228
BRAKE PEDAL RATIO CHANGER
Filed March 14, 1957
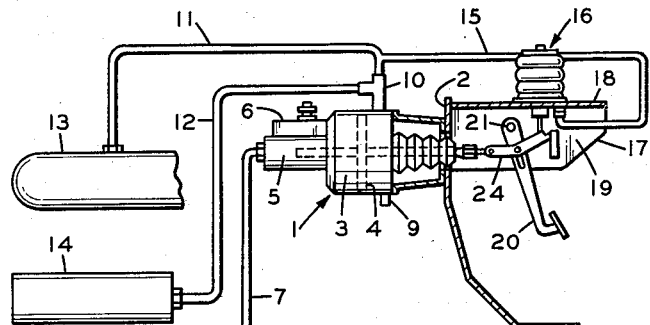
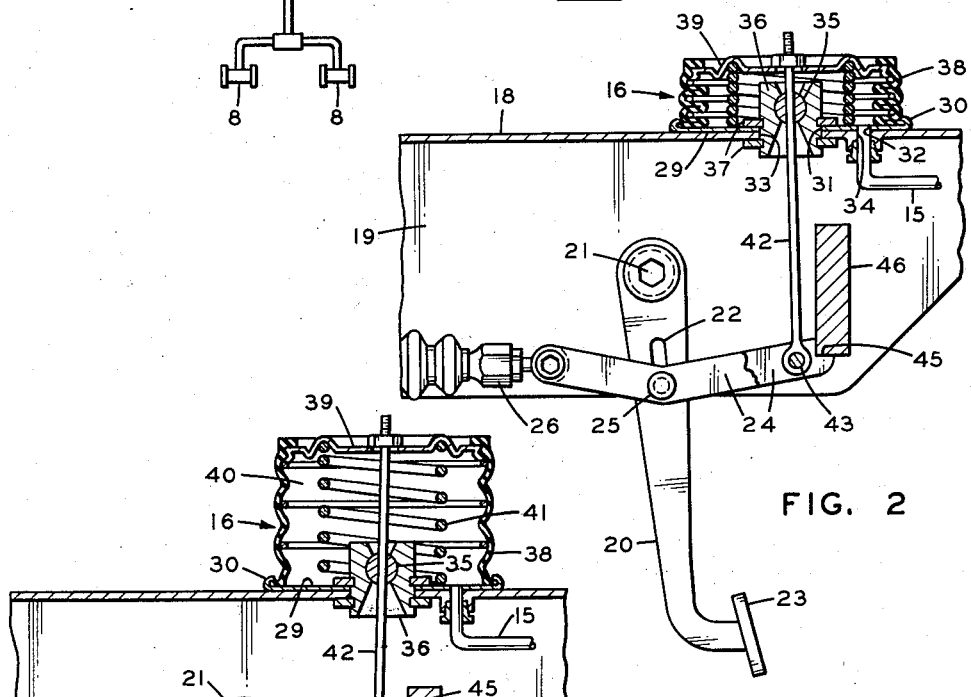
INVENTOR.
STEVE SCHNELL
BY
*Gravely, Lieder, Woodruff & Wills*
ATTORNEYS United States Patent Office 2,844,228
Patented July 22, 1958

2,844,228

BRAKE PEDAL RATIO CHANGER

Steve Schnell, St. Louis, Mo., assignor to Wagner Electric Corporation, St. Louis, Mo., a corporation of Delaware Application March 14, 1957, Serial No. 646,046

6 Claims. (Cl. 188—152)

This invention relates to power brakes for automotive vehicles and in particular to a brake pedal ratio changer employed therewith.

Conventional power brake booster units of the vacuum type utilize the pressure differential between the atmosphere and the vacuum supplied by the vehicle motor to augment the manual effort of the operator on the brake pedal which is provided with a low pedal ratio and a reduced stroke. The brakes also can be applied by direct manual effort in the event of the vacuum supply failure, but greatly increased manual effort is required in power brake constructions as compared with conventional brakes due to the lower pedal ratio and the shorter pedal stroke. It has been proposed to employ an auxiliary means to move the brake pedal to a raised or full stroke position when the vacuum supply failed thereby increasing the brake pedal ratio and decreasing the direct manual effort required. However, when the brake pedal is moved to a full stroke position without the operator's knowledge, he may automatically move his foot to the position formerly occupied by the brake pedal in the short stroke or low pedal ratio position for the next brake pedal application. Accordingly, precious seconds may be wasted while the operator attempts to locate the brake pedal in order to apply the vehicle brakes which obviously could result in an accident.

An object of the instant invention is to provide a brake pedal ratio changer for a power brake booster unit in which the pedal position and ratio remain unchanged upon the loss of the vacuum source until after the operator first actuates the brake pedal to apply the vehicle brakes, the pedal ratio then being automatically increased for manual brake applications until the power or vacuum source is restored.

Other objects and advantages will become apparent hereinafter.

Briefly, the present invention comprises a link having pivotal end connections with a power brake unit and the rod of a vacuum operated means, the midportion of the link having a slidable and pivotal connection maintained in one end of an elongated slot in a brake pedal arm by said vacuum means, yieldable means for moving the link connection to the other end of the slot, and anchoring means engaged by the link to hold the link in the one end of the slot in the event of a vacuum failure until a braking application is made.

The invention also consists in the parts and in the arrangements and combinations of parts hereinafter described and claimed. In the accompanying drawing which forms a part of this specification and wherein like numerals refer to like parts wherever they occur:

Fig. 1 is a semi-diagrammatic side elevational view of a power brake mechanism embodying the present invention, Fig. 2 is an enlarged view, partly in section, showing the details of the present invention in normal power assisted position, and Fig. 3 is a view similar to Fig. 2, but showing the position of the parts in case of a power failure.

Referring to Fig. 1 of the drawing, a power brake booster unit 1 of conventional construction is secured to the engine side of a dash panel 2. The unit 1 comprises a booster cylinder 3, a piston and plunger assembly 4 reciprocable therein, and a hydraulic master cylinder 5 provided with an integral reservoir 6. A conduit 7 is connected between the pressure side of the master cylinder 5 and wheel cylinders 8 of the vehicle wheel brake assemblies (not shown). The booster cylinder 3 is provided with an air inlet 9 and a vacuum inlet 10, the latter being connected by conduits 11 and 12 to an intake manifold 13 and a vacuum reservoir 14, respectively, of the vehicle engine (not shown). Another conduit 15 connects the vacuum inlet 10 to a pedal positioning means or servo unit 16.

Extending rightwardly from the dash panel 2 is a structural member 17 including a horizontal wall 18 which supports the pedal positioning means 16, and a vertical wall 19 on which a brake pedal arm 20 is mounted by a pivotal connection 21. An elongated slot 22 is formed in the arm 20 intermediate the connection 21 and a brake pedal 23, and a pair of similar links 24 are pivotally and slidably mounted on the arm 20 by a pin 25 extending through the slot 22. The forward ends of the links 24 are pivotally connected to a push rod 26 secured to the piston assembly 4 in the booster cylinder 3. The rearward or right-hand ends of the links 24 are pivotally connected to the pedal positioning means 16, which controls the position of the pin 25 in the slot 22 of the arm 20, as will be described presently.

Leftward movement of the brake pedal 23 actuates conventional valving to create a vacuum in the booster cylinder 3 forward of the piston assembly 4 whereby this assembly 4 moves to the left under atmospheric pressure actuation to apply the brakes. Because of the direct mechanical connection of the brake pedal arm 20 to the push rod 26, the piston assembly 4 may be moved manually to develop braking pressures in the event of a failure of the vacuum supply to the left-hand side of the piston assembly 4 in the booster cylinder 3.

The pedal positioning means 16 includes a lower plate 29 having an upturned peripheral edge 30, a centrally located aperture 31, and another aperture 32. These apertures are aligned with similar apertures 33 and 34, respectively, provided in the structural member wall 18. A ball joint 35 is provided with a housing 36 secured in the aligned apertures 31 and 33 by suitable means, such as snap rings 37. The other apertures 32 and 34 form a vacuum inlet to the pedal positioning means 16 from the conduit 15. The pedal positioning means 16 also includes a resilient bellows 38 having one end sealably secured to the raised peripheral edge 30 of the lower plate 29. The other end of the bellows 38 is sealed by a disc type piston or plate 39 thereby forming a vacuum chamber 40 within the bellows 38. A spring 41 is positioned in the chamber 40 to bias the plate 39 from the lower plate 29. An actuating rod 42 is secured to the plate 39 and extends through the vacuum chamber 40 of the pedal positioning means 16 and is slidably received through the ball joint 35. The lower end of the actuating rod 42 is pivotally connected as at 43 to the right-hand end of the spaced links 24 and it is apparent that vertical movement of the rod 42 controls the sliding of the pin 25 in the slot 22 of the brake pedal arm.

The extreme rightward ends of the links 24 are notched as at 45 and an anchor block 46 is secured to the structural member 17 in position to receive the notches 45 when the brake pedal is in low pedal position, as shown in Fig. 2.

Still referring to Fig. 2, it will be seen that when the vehicle engine is in normal running condition so that a vacuum is applied to the intake fitting 10 of the booster cylinder 3 for actuating the power brake unit 1, vacuum will also be supplied to the vacuum chamber 40 beneath the plate 39 of the pedal positioning cylinder 16. Since the opposite side of the plate 39 is exposed to the atmosphere, a pressure differential is created effecting a force moving the plate downwardly against the force of the spring 41. Thus the actuating rod 42 moves the links 24 downwardly so that the pin 25 is positioned at the end of the slot 22 nearest the pedal 23 so that a low pedal ratio is provided, and the pedal 23 is positioned for a short pedal stroke. This low pedal position facilitates the transfer of the operator's foot from the accelerator pedal (not shown) to the brake pedal 23.

To effect a power braking application under these conditions, a manual force is applied to the brake pedal 23 to move the links 24 and push rod 26 leftwardly to actuate the power braking unit. The manual force is assisted by the force of the power booster unit 1 to actuate the wheel brake assemblies 8 and no high pedal ratio is required. It is apparent that as the brake pedal 23 is depressed or moved to the left in the drawing, the notched ends 45 of the links 24 are unseated from locking engagement with the lower end of the anchor block 46, the actuating rod 42 pivoting the ball joint 35 and sliding therein to maintain the pin 25 in the lower end of the brake pedal slot 22 maintaining the desired low pedal ratio and the accompanying short pedal stroke. When the manual force is released, the parts return to the positions shown in Fig. 2 as long as the vacuum is maintained in the pedal positioning cylinder 16, and the notches 45 of the links 24 move into locking engagement with the lower end of the anchor block 46.

In the event vacuum is lost while the pedal 23 is in the short stroke position, the locking engagement between the link notches 45 and the block 46 prevents immediate upward displacement of the links 24 and the actuating rod 42 along with a simultaneous pedal ratio change even though the pressure differential across the cylinder plate 39 is destroyed so that the spring 41 exerts a force tending to move the plate 39 upwardly. Therefore, the pedal 23 remains in the short stroke position until the first time that the operator applies a braking force on the pedal. When this manual force is applied, the links 24 are disengaged from the anchor block 46 and the return spring 41 of the cylinder 16 moves the plate 39 and the rod 42 upwardly. This upward movement of the rod 42 causes the links 24 to pivot about the left-hand ends thereof so that the pin 25 slides to the upper end of the slot 22 providing a relatively high pedal ratio. At the same time, the position of the pin 25 in the slot 22 causes the brake pedal 23 to be moved to the right so that the length of stroke is automatically changed from short to long without operator effort. When the manual force is released, the parts move to the position shown in Fig. 3. The full stroke or increased pedal ratio position is provided to reduce the manual effort required to effect a braking application when vacuum is not present to create a pressure differential in the power booster unit 1. When the vacuum source is restored the plate 39 of the pedal positioning cylinder 16 will be drawn downwardly to cause the rod 42 to pivot the links 24 into normal low pedal position.

It is now apparent that an improved brake pedal ratio changer has been provided in which the pedal position is prevented from changing without the knowledge of the operator so that no accident can occur by reason of delay in finding and applying the brake pedal.

Although the present invention has been described in combination with a hydraulic brake system having a vacuum operated power brake device 1, it is apparent that the power brake device and servo unit 16 may be operated from an air pressure source instead of a vacuum source 13.

This invention is intended to cover all changes and modifications of the present disclosure that will be readily apparent to those skilled in the art.

What I claim is:

1. In combination with a hydraulic brake system for a motor vehicle including a vacuum operated power brake device having a vacuum source connected thereto for normally developing braking pressures in said hydraulic brake system; a brake applying arm pivotally mounted adjacent to said power brake device and having a brake pedal on its free end for movement toward said power brake device for initiating a braking application, said arm having an elongated slot therein; a link having one end pivotally connected to said power brake device and having a pivotal sliding connection intermediate its ends with the slot of said arm; a servo unit having the other end of said link connected thereto, the servo unit being connected to the vacuum source for holding said link in a first position relative to said arm; yieldable means adapted to move said link to a second position relative to said arm in the event of failure of the vacuum source; said second position of said link with said arm being adapted to move said brake pedal to a position further from said power brake device than said first position of said link with said arm; and means for holding said link in said first position in the event of failure of the vacuum source until said brake pedal is initially moved toward said power brake device to provide a braking application.

2. A device for controlling the position of a brake pedal for a power brake unit of a hydraulic brake system, comprising a support, a pedal arm having one end pivotally connected to said support and carrying a brake pedal on its other end, a slot formed in said arm intermediate its ends; a link having a slidable and pivotal connection intermediate its ends with the slot of said arm, one end of said link being connected to a power brake unit and the other end being connected to a rod, said arm being pivotal to move said link toward said power brake unit to initiate a braking application; first means for moving said rod downwardly to slide said link connection to a first position in the slot of said arm whereby said arm is pivoted to a low pedal position; second means adapted to move said rod upwardly to slide said link connection to a second position in the slot of said arm whereby said arm is pivoted to a high pedal position; said first means being operative when said power brake unit is operative and said second means being operative when said power brake unit is inoperative; and other means for maintaining said link connection in said first position on said arm when said second means becomes operative until the arm is first pivoted to move the link toward the power brake unit to initiate a braking application.

3. In combination with a hydraulic brake system for a motor vehicle including a vacuum operated power brake device having a vacuum source connected thereto for normally developing braking pressures in said hydraulic brake system; a brake applying arm pivotally mounted adjacent to said power brake device and having a brake pedal on its free end for movement toward said power brake device for initiating a braking application, said arm having an elongated slot therein; a link having one end pivotally connected to said power brake device and having a pivotal sliding connection intermediate its ends with the slot of said arm; a servo unit connected to said link adjacent to the other end thereof, said servo unit being connected to the vacuum source for holding the pivotal sliding connection of said link in a first position in one end of the slot in said arm; yieldable means adapted to move said pivotal sliding connection of said link to a second position in the other end of the slot of said arm in the event of a failure of the vacuum source, the movement of said pivotal sliding connection of said link in said slot to said second position being adapted to move said brake pedal to a position further from said power brake device than when said pivotal sliding connection of said link is in said first position with said arm; and means for holding the sliding pivotal connection of said link in said first position with said arm in the event of a failure of the vacuum source until said brake pedal is moved toward said power brake device to initiate a braking application.

4. In combination with a hydraulic brake system for a motor vehicle including a vacuum operated power brake device having a vacuum source connected thereto for normally developing braking pressures in said hydraulic brake system; a brake applying arm pivotally mounted adjacent to said power brake device and having a free end with a brake pedal thereon for brake applying actuation toward said power brake device, said arm having an elongated slot therein; a link having one end pivotally connected to said power brake device and having a pivotal sliding conection intermediate its ends with the slot in said arm; a vacuum operated cylinder having a piston rod connected to said link adjacent to its other end for holding the pivotal sliding connection of said link in a first end of the slot of said arm; a coil spring acting in opposition to the vacuum applied force on said piston rod for moving said pivotal sliding connection of said link to a second end of the slot of said arm in the event of a failure of said vacuum source for said cylinder, the link movement to said second end of said slot being adapted to move said brake pedal to a position further from said power brake device than when the pivotal sliding connection of said link is in said first end of said slot; anchor means adjacent to said other end of said link, said other end of said link being adapted to engage said anchor means for holding the pivotal sliding connection of said link in said first end of said slot in the event of a failure of the vacuum source until said brake pedal is moved toward said power brake device.

5. A device for controlling the position of a brake pedal for a power brake unit of a hydraulic brake system, comprising a support, a pedal arm having one end pivotally connected to said support and carrying a brake pedal on its other end, a slot formed in said arm intermediate its ends; a link having connection freely movable in said slot, said link connection being intermediate its ends one of which is connected to a power brake unit and the other being connected to a rod, said arm being pivotal to move said link toward said power brake unit to initiate a braking application; pressure means for moving said rod downwardly to move said link connection to a first position in said slot whereby said arm is pivoted to a low pedal position, said pressure means being operative when said power brake unit is operative; yieldable means acting in opposition to said pressure means for moving said link connection to a second position in said slot to pivot said arm to provide a high pedal position when said pressure means is inoperative; and abutment means engaged by said other end of said link for maintaining said link connection in said first position with said arm when said yieldable means becomes operative until said arm is first moved toward said power brake unit to effect a braking application.

6. A device for controlling the position of a brake pedal for a power brake unit of a hydraulic brake system, comprising a support, a pedal arm pivotally connected with said support, a link having one end connected with a power brake unit and having a slidable pivotal connection intermediate its end with said pedal arm, said slidable pivotal connection being movable relative to said pedal arm between a high pedal position and a low pedal position, first means connected to the other end of said link for normally maintaining said slidable pivotal connection in the low pedal position, resilient means adapted to move said slidable pivotal connection to the high pedal position when said first means is inoperative, and means for preventing the movement of the slidable pivotal connection to high pedal position until said pedal arm is first moved to actuate the power brake unit.

References Cited in the file of this patent
UNITED STATES PATENTS

| 2,037,869 | Wall | Apr. 21, 1936 |
| 2,706,020 | Freers et al. | Apr. 12, 1955 |
| 2,809,725 | Ayers | Oct. 15, 1957 |